(12) United States Patent
Patel et al.

(10) Patent No.: US 8,061,477 B2
(45) Date of Patent: Nov. 22, 2011

(54) ACOUSTIC MANAGEMENT OF FLUID FLOW WITHIN A DUCT

(75) Inventors: Jayant Dahyabhai Patel, Lake Forrest, CA (US); W. Forrest Frantz, Parkdale, OR (US); Douglas Dean Maben, Snohomish, WA (US); Clifford John Petersen, Irvine, CA (US); David V. Algas, Riverside, CA (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 12/195,193

(22) Filed: Aug. 20, 2008

(65) Prior Publication Data
US 2010/0044149 A1 Feb. 25, 2010

(51) Int. Cl.
*E04F 17/04* (2006.01)
*F16L 11/26* (2006.01)
*F16L 11/14* (2006.01)

(52) U.S. Cl. .................... 181/224; 138/129; 138/122

(58) Field of Classification Search .............. 181/224, 181/225, 246; 138/177, 129, 122
See application file for complete search history.

(56) References Cited

U.S. PATENT DOCUMENTS

| | | | | |
|---|---|---|---|---|
| 1,295,630 A * | 2/1919 | Sundh | ........................... | 138/122 |
| 3,374,856 A * | 3/1968 | Wirt | ............................. | 181/224 |
| 3,543,803 A * | 12/1970 | Chrow | .......................... | 138/103 |
| 3,626,988 A * | 12/1971 | Chu | ............................. | 138/121 |
| 4,196,031 A * | 4/1980 | Lalikos et al. | ................ | 156/143 |
| 4,295,496 A * | 10/1981 | Bixby | ........................... | 138/122 |
| 4,452,280 A * | 6/1984 | Werner | ....................... | 138/131 |
| 5,074,324 A * | 12/1991 | Ng | ................................... | 137/13 |
| 5,482,089 A * | 1/1996 | Weber et al. | .................. | 138/122 |
| 5,526,849 A * | 6/1996 | Gray | .............................. | 138/133 |
| 5,548,093 A * | 8/1996 | Sato et al. | ..................... | 181/224 |
| 5,702,132 A * | 12/1997 | Friederich et al. | ............ | 285/235 |
| 5,731,557 A * | 3/1998 | Norres et al. | ................. | 181/233 |
| 5,803,127 A * | 9/1998 | Rains | ............................. | 138/113 |
| 5,901,754 A * | 5/1999 | Elsasser et al. | ............... | 138/118 |
| 6,000,435 A | 12/1999 | Patel et al. | | |
| 6,105,620 A * | 8/2000 | Haberl | .......................... | 138/118 |
| 6,152,186 A * | 11/2000 | Arney et al. | .................. | 138/129 |
| 6,237,642 B1 * | 5/2001 | Lepoutre | ...................... | 138/129 |
| 6,250,339 B1 | 6/2001 | Ikegami et al. | | |
| 6,253,873 B1 * | 7/2001 | Norres et al. | ................. | 181/224 |

(Continued)

FOREIGN PATENT DOCUMENTS

EP  1 344 969 A2  9/2003

(Continued)

OTHER PUBLICATIONS

PCT International Search Report and the Written Opinion of the International Search Authority in International Application No. PCT/US2009/050267 dated Oct. 21, 2009; 14 pages.

*Primary Examiner* — Edgardo San Martin
(74) *Attorney, Agent, or Firm* — Hope Baldauff Hartman, LLC

(57) ABSTRACT

Apparatus and methods described herein provide for the management of noise associated with a duct. A sound-dampening apparatus is provided consisting of a duct through which a fluid flows, such as an air duct. A flexuous cord is helically wound around the inner or outer surface of the duct at a pitch corresponding to a selected acoustical frequency range associated with the fluid flow through the duct.

17 Claims, 8 Drawing Sheets

U.S. PATENT DOCUMENTS

| | | |
|---|---|---|
| 6,811,192 B2 | 11/2004 | Patel et al. |
| 6,820,654 B2 * | 11/2004 | Lindsay ............... 138/153 |
| 6,830,076 B1 | 12/2004 | Patel |
| 7,347,456 B2 | 3/2008 | Patel et al. |
| 2003/0075228 A1 * | 4/2003 | Tippett ............... 138/125 |
| 2005/0092384 A1 | 5/2005 | Curb et al. |
| 2006/0213567 A1 | 9/2006 | Parpart et al. |
| 2007/0028983 A1 * | 2/2007 | Lord et al. ............ 138/173 |
| 2008/0001406 A1 | 1/2008 | Patel et al. |
| 2008/0012331 A1 | 1/2008 | Angus et al. |
| 2008/0308674 A1 * | 12/2008 | Frantz et al. ............ 138/128 |

FOREIGN PATENT DOCUMENTS

| | | |
|---|---|---|
| JP | 2001277372 A * | 10/2001 |
| JP | 2004204861 A * | 7/2004 |
| WO | WO 95/06838 A1 | 3/1995 |

* cited by examiner

ACOUSTIC MANAGEMENT OF FLUID FLOW WITHIN A DUCT

BACKGROUND

Noise in the interior of an aircraft may be generated from a number of sources, including the aircraft engines and other equipment; airframe or fuselage vibrations; airflow over the exterior skin of the fuselage; and fans and airflow in the environmental control systems (ECS). A high level of noise in the interior cabin spaces of the aircraft can have an adverse impact on cabin occupants. Noise may affect passenger comfort and limit communication among the crew and passengers. In addition, prolonged exposure to high noise levels may impair hearing.

The ECS in an aircraft may include ram air, cabin pressurization, conditioned air supply, avionics cooling, auxiliary power unit, recirculation, cockpit cooling, and cargo heating systems. Airlines and airplane manufacturers traditionally control noise in the ECS by integrating mufflers and silencers into the systems and by wrapping air ducts in noise-insulating batting. These methods, however, add weight, increase operating costs, reduce performance and range, and increase complexity of the overall aircraft systems.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods described herein provide for the reduction of noise. According to aspects presented herein, a sound-dampening apparatus is provided consisting of a duct through or around which a fluid flows. In one aspect, the fluid may be air and the duct may be a flexible air duct. A flexuous cord is helically wound around the inner or outer surface of the duct in a continuous length, maintaining a specific pitch to dampen sound in a specific frequency range. According to aspects, the flexuous cord may be made of extruded plastic, metal wire, or synthetic fiber. In one aspect, the flexuous cord has a round cross-section. In another aspect, the flexuous cord has a triangular or other cross-section that has a flat side that abuts the surface of the component. In a further aspect, the flexuous cord is hollow.

According to further aspects presented herein, a method for dampening sound associated with an air duct is provided. The method entails determining a range of acoustic frequencies that are desired to be dampened, and then helically wrapping the air duct with a flexuous cord at a specific pitch to dampen sound in the target range of acoustic frequencies. In a further aspect, the duct may consist of several segments, each wrapped by the flexuous cord at different pitch angles to dampen sound in subsets of the target range of acoustic frequencies.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for reducing noise emanating from the interior or exterior surface of an air duct. As discussed briefly above, the ECS of an aircraft often includes integrated mufflers and silencers as well as air ducts wrapped in insulation batting in order to reduce noise in the aircraft cabin. These elements add weight and complexity to the aircraft, making the aircraft more expensive to manufacture and operate.

Utilizing the concepts and technologies described herein, a helically wrapped air duct can be implemented in an aircraft ECS that will reduce noise in the aircraft cabin, eliminating or reducing the need for mufflers or insulation, thus saving weight and cost in the aircraft systems. The noise-reducing air duct may be fabricated from less expensive materials and provide better noise attenuation performance than ducts created from alternative materials. In addition, the frequencies of sound dampened by the noise-reducing air duct can be tuned by changing the pitch of the wrapping. Because the noise-reducing air duct can be fabricated as flexible hoses and made in longer lengths than traditional ducting, it can be installed in the aircraft more easily and inexpensively than rigid ducts made from alternative duct materials.

Throughout this disclosure, embodiments are described with respect to air ducts used in the ECS of an aircraft. An aircraft environment provides a useful example for embodiments described herein since there are many sources of unwanted noise and reduction of noise is a relative high priority. However, it should be understood that the concepts presented herein are equally applicable to ECS in other environments, including, but not limited to, commercial and residential buildings, ships, cars, spacecraft, and other vehicles.

Figure 1:
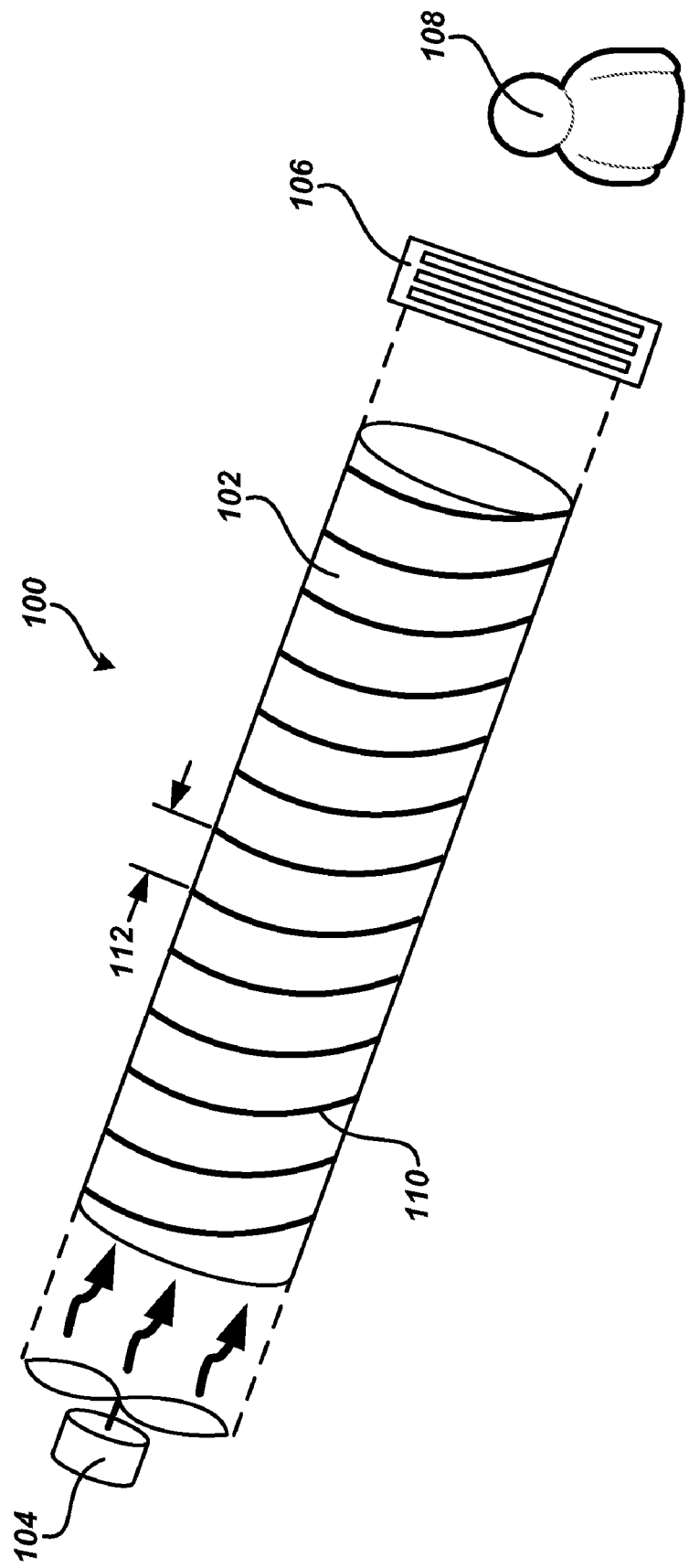
FIG. 1 is a perspective view of a noise-reducing duct used in an aircraft environmental control system, according to embodiments presented herein.

In the following detailed description, references are made to the accompanying drawings that form a part hereof, and that show by way of illustration specific embodiments or examples. Referring now to the drawings, in which like numerals represent like elements through the several figures, a noise-reducing air duct will be described. FIG. 1 shows elements of an aircraft ECS 100, including a noise-reducing air duct 102, according to embodiments provided herein. Also included in the ECS 100 is a fan 104 that forces conditioned air through the duct 102 to an outlet vent 106 or other air terminal.

Unwanted noise may be produced by the components of the depicted ECS 100, including fan noise and flow-generated noise produced by the flow of air through the duct 102 and the outlet vent 106. In addition, noise from external sources may be introduced into the ECS, such as noise from the operation of aircraft engines or other equipment, or vibrations and boundary layer noise created by air flowing over the exterior of the fuselage. The noise may be perceived by a passenger 108 in the aircraft cabin at the outlet vent 106 or at a point where the noise is emanated by the duct 102, known as breakout noise. ECS airflow may further emanate the noise throughout the cabin.

According to embodiments, the noise-reducing duct 102 may be a cylindrical and flexible hose, which may be constructed from one or more layers or plies of thin plastic or synthetic fiber materials, including, but not limited to, polyvinylidene fluoride (PVDF) foam, silicone glass-fiber, thermoset composites, or other plastic sheets or resins. It will be appreciated that the noise-reducing ducts may also be manufactured from rigid materials, such as composites, thermoplastics, or metal, according to further embodiments. The noise-reducing duct may also be manufactured in shapes other than cylindrical, such as rectangular ducts.

A flexuous cord 110 is helically wound around the internal or external surface of the duct 102 in a continuous length maintaining a specific pitch 112 or distance between subsequent windings. This helical wrapping of flexuous cord 110 creates the desired noise attenuation effect and may also provide structural reinforcement to the duct 102. The characteristics of the noise attenuating effect depend upon the selected pitch 112 of the helical winding of the flexuous cord 110 as well as the material from which the cord 110 is constructed, as will be discussed in detail below.

According to one embodiment, the flexuous cord 110 is constructed from an extruded polyetherimide (PEI), such as ULTEM® from SABIC Innovative Plastics of Pittsfield, Mass. In another embodiment, the flexuous cord 110 is made of KEVLAR® from E. I. du Pont de Nemours and Company of Wilmington, Del. It will be appreciated by one skilled in the art that the flexuous cord 110 may be constructed from a number of materials, including, but not limited to, thermoplastics, metallic wire, carbon fiber, and plastic or elastomer/rubber covered metallic wire.

In one embodiment, the flexuous cord 110 is bonded to the outer surface of the duct 102 using an adhesive. In other embodiments, the flexuous cord 110 may be incorporated into the duct 102 during fabrication. For example, the flexuous cord 110 may be placed between the plies of a multi-layer or composite duct before the layers of the composite duct are cured. This provides for a single-cycle fabrication process of the noise-reducing duct 102. It will be appreciated that any number of methods known in the art may be used to bond the flexuous cord 110 to the surface of the duct 102. In a further embodiment, the flexuous cord 110 is held in contact with the surface of the duct 102 by structural pressure and no bonding between the flexuous cord 110 and the duct surface is required. For example, the flexuous cord 110 may be wound in a helical pattern on a form and the duct material stretched over the outside of the helix, such that the helically wound flexuous cord 110 maintains contact with the inside surface of the duct 102.

Figure 2:
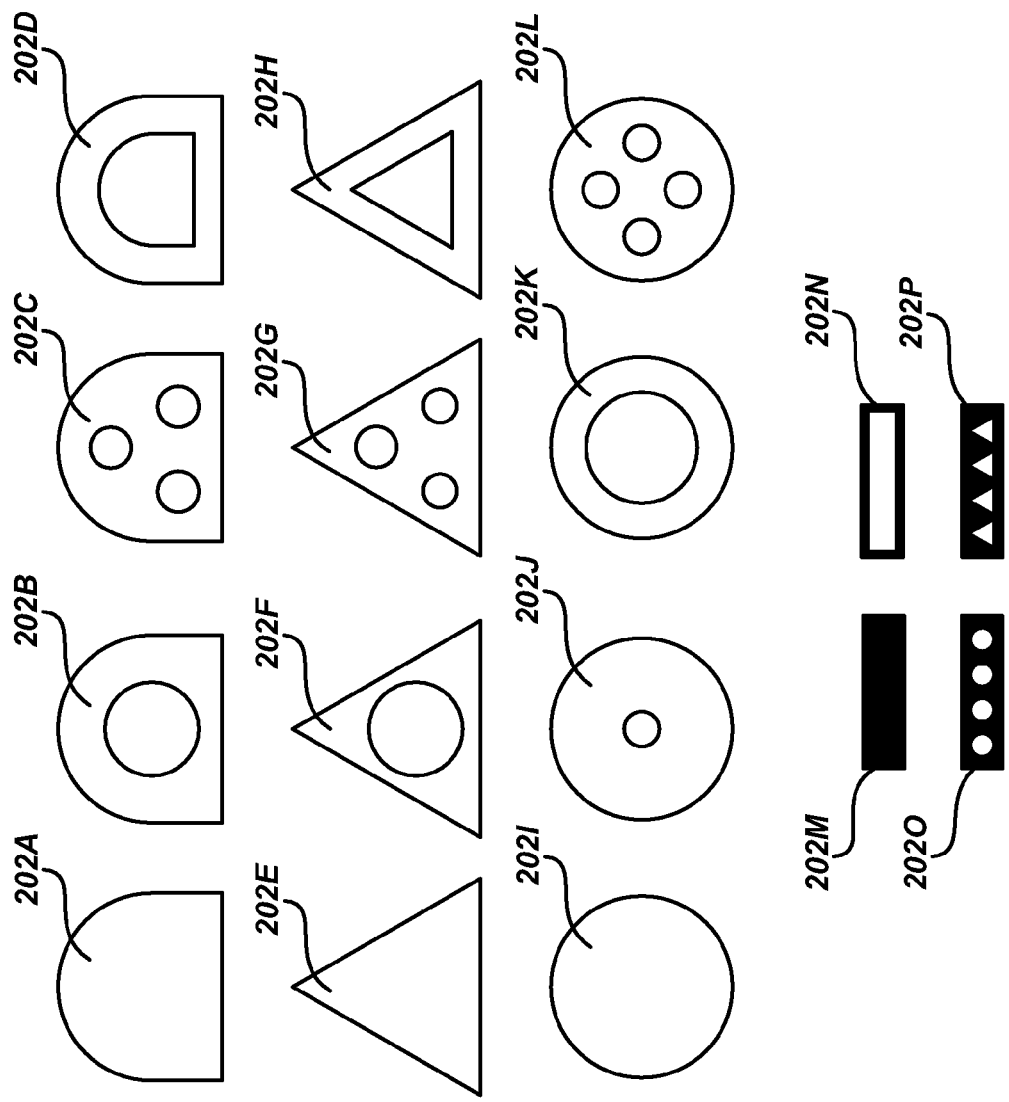
FIG. 2 is a series of cross-sections illustrating some examples of profiles of a flexuous cord provided in the embodiments described herein.

The flexuous cord 110 may have a number of profiles 202A-202P, as shown in FIG. 2. The profile of the flexuous cord 110 may affect the noise attenuating effect of the duct 102 as well as the ease with which the cord 110 is bonded to the surface of the duct 102. In one embodiment, the flexuous cord 110 is circular with a flat bottom, as depicted in profiles 202A-202D. The flat bottom provides for ease of attachment of the flexuous cord 110 to the duct material during fabrication of the duct 102. In other embodiments, the flexuous cord 110 may have a triangular profile 202E-202H, a round profile 202I-202L, or may be a flat, thin strip 202M-202P. Further, the flexuous cord 110 may be solid, as depicted in profiles 202A, 202E, 202I, and 202M, or it may be hollow with any number of chambers, as shown in profiles 202B-202D, 202F-202H, 202J-202L, and 202N-202P. A hollow flexuous cord 110 provides the advantages of reduced weight, lower cost, and better strength/stiffness, as well as better noise attenuating performance. It will be appreciated that the flexuous cord 110 may also have a profile not depicted in FIG. 2.

Figure 3:
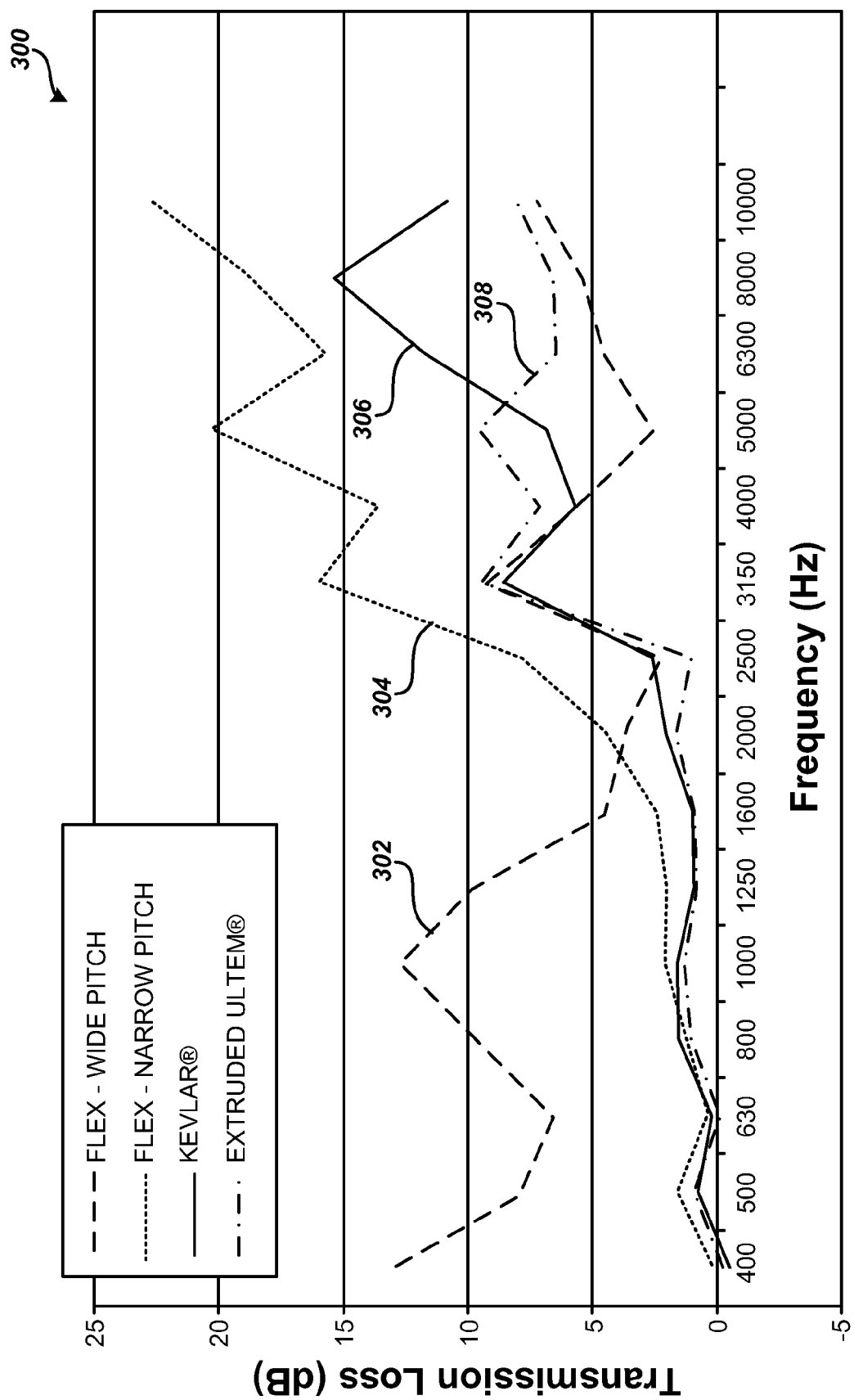
FIG. 3 is a line graph depicting the relative sound dampening performance of various duct configurations.

As described briefly above, the sound dampening characteristics of the noise-reducing duct 102 depend upon the selected pitch 112 of the helically wound flexuous cord 110. FIG. 3 illustrates the relative noise attenuating performance of a duct 102 with a flexuous cord 110 wound at a relatively wide pitch 112 versus a duct 102 with a flexuous cord 110 wound at a relatively narrow pitch 112. The line graph 300 depicts the transmission loss or reduction in sound level, measured in decibels (dB), attained by different air ducts at different acoustic frequencies, expressed in Hertz (Hz).

The transmission loss was measured in flexible ducts 102 constructed from sheets of PVDF foam and fiberglass fabric, helically wound at various pitches 112 by a hollow PEI flexuous cord 110 with a round profile. For comparison, hard-walled ducts made of KEVLAR® and extruded PEI not helically wound by a flexuous cord were also tested. As shown in the line graph 300, a duct helically wound at a relatively wide pitch 112 provides greater reduction of noise in the lower frequency range of 400 Hz to 1600 Hz, as depicted by line 302. A duct helically wound at a relatively narrow pitch 112, on the other hand, provides greater reduction of noise in the upper frequency range of 2000 Hz to 10000 Hz, as depicted by line 304. The line graph 300 in FIG. 3 also shows the reduction in noise provided by the hard-walled ducts made of KEVLAR®, depicted by line 306, and extruded PEI, depicted by line 308.

The value of the pitch 112 utilized in the fabrication of the noise-reducing duct 102 is determined by ascertaining the acoustic frequency range of noise that is to be reduced. Duct noise attenuation in the target acoustic frequency range can be obtained by applying a specific pitch 112 for the helical winding of the flexuous cord 110 onto ducts 102 of various diameters. For example, the cabin of an aircraft experiences low frequency noise, in the range of 60 Hz to 2000 Hz, generated by the aircraft ECS, other aircraft systems, and boundary layer airflow over the fuselage. TABLE 1 shows pitch values determined from experimentation to address this frequency range for various diameters of duct hoses having an extruded PEI flexuous cord 110 helically wound around the outer surface of the duct, according to one embodiment.

TABLE 1

| Duct Construction | Duct Diameter (in.) | Polyetherimide Cord Diameter (in.) | | Pitch (in.) | |
| --- | --- | --- | --- | --- | --- |
| | | Hollow | Solid | Hollow | Solid |
| 1-Ply | 0.75 | | 0.06 | | 0.37 |
| | 1.00-1.25 | | 0.06 | | 0.43 |
| | 1.50 | 0.08 | 0.08 | 0.50 | 0.50 |
| | 1.75-2.50 | 0.09 | 0.09 | 0.62 | 0.62 |
| | 3.00 | 0.09 | 0.09 | 0.75 | 0.75 |
| | 3.50-4.00 | 0.10 | 0.10 | 0.75 | 0.75 |
| | 4.50-5.50 | 0.10 | 0.10 | 0.75 | 0.75 |
| 2-Ply | 5.50-7.50 | 0.12 | 0.12 | 0.87 | 0.87 |
| | 8.00-9.00 | 0.15 | 0.15 | 0.87 | 0.87 |
| | 9.50-12.00 | 0.18 | 0.18 | 0.95 | 0.95 |

Figure 4B:
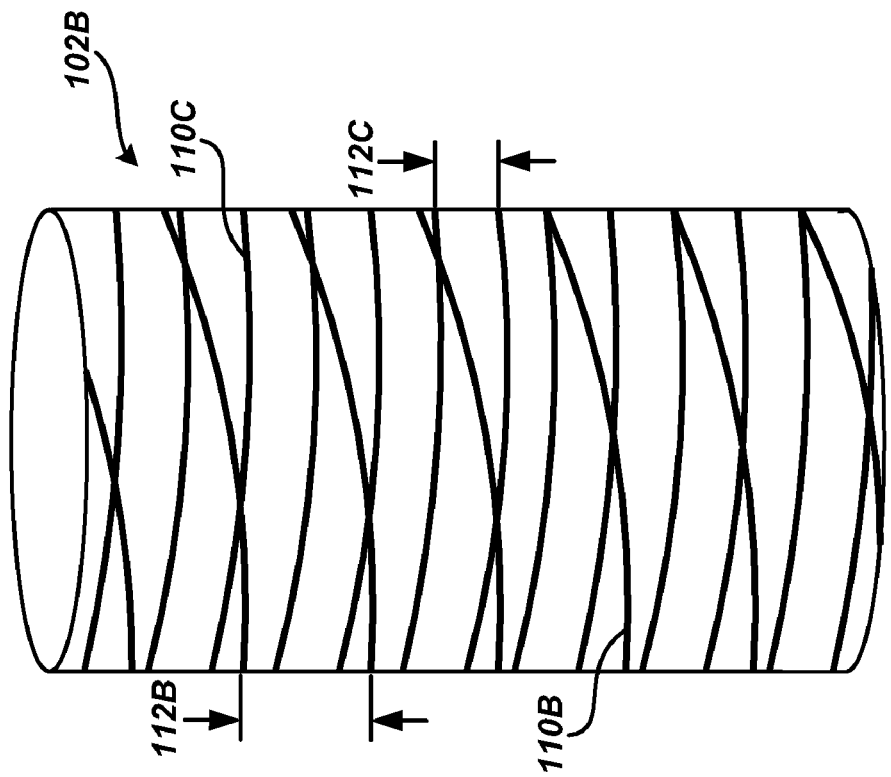
FIGS. 4A and 4B are perspective views of noise-reducing ducts illustrating alternative configurations of the flexuous cord, according to further embodiments described herein.
Figure 4A:
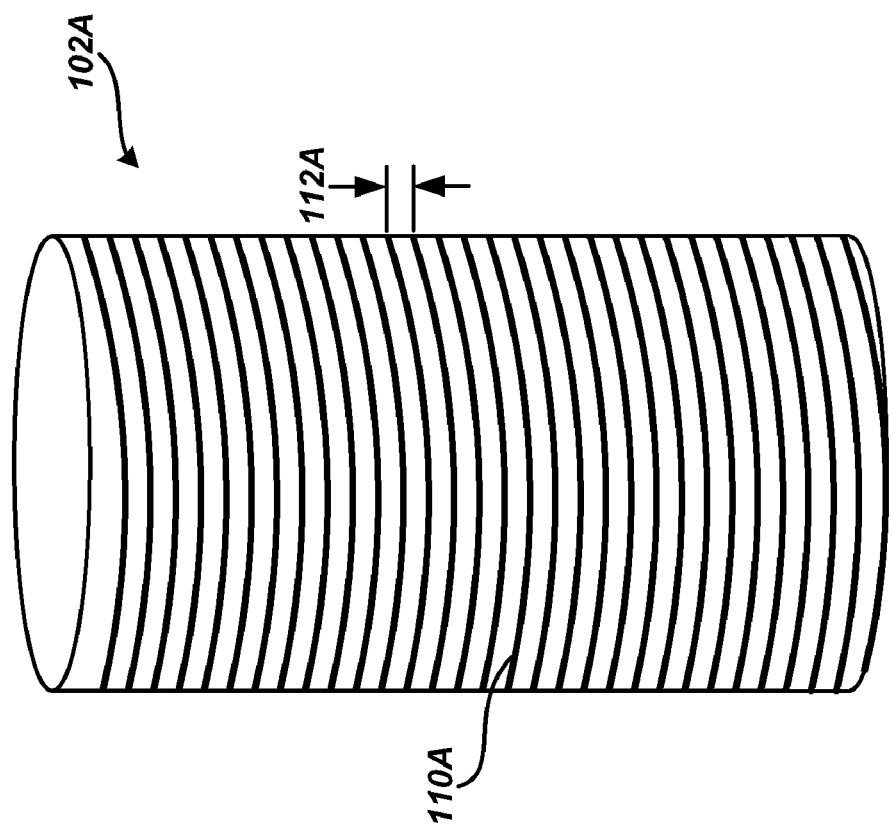

FIGS. 4A and 4B illustrate noise-reducing ducts 102A and 102B having flexuous cords 110A, 110B, and 110C helically wound around the surface of the ducts at various pitches 112A-112C. According to one embodiment, a noise-reducing duct 102A having a flexuous cord 110A wound at a relatively narrow pitch 112A, as depicted in FIG. 4A, may be combined in an aircraft ECS with ducts 102 having a flexuous cord 110 wound at a relatively wide pitch 112, as illustrated in FIG. 1. The combined ducts 102A and 102 provide noise reduction in both the high and low frequency ranges, respectively, thus providing a broader range of noise reduction in the overall system in order to address the desired target range.

In another embodiment, the ducts 102B of the aircraft ECS are helically wound with two, separate flexuous cords 110B and 110C, one wound at a wide pitch 112B and the other wound at a narrow pitch 112C, as depicted in FIG. 4B. The two flexuous cords 110B, 110C may be wound in the same direction or opposite directions from each other. In this way, a broader range of noise reduction may be attained, as described above, with only one duct 102B having to be fabricated.

In further embodiments, the pitch 112 of the helical winding may be varied along a single duct 102. The pitch 112 may be narrower at points where higher frequency dampening is desired or where required structurally by bends in the duct at installation, and wider along the straight segments of the duct or where lower frequency dampening is preferred. By utilizing different pitches 112 at various points along the same duct 102, a broad range of noise reduction may be achieved in the overall system, while incorporating reduction of specific frequencies of breakout noise at various points along the duct 102 as required. It will be appreciated by one skilled in the art that many more combinations of ducts and flexuous cords of various pitches than those described herein may be imagined to address a particular acoustic frequency range of noise, and this application is intended to cover all such combinations.

Figure 5:
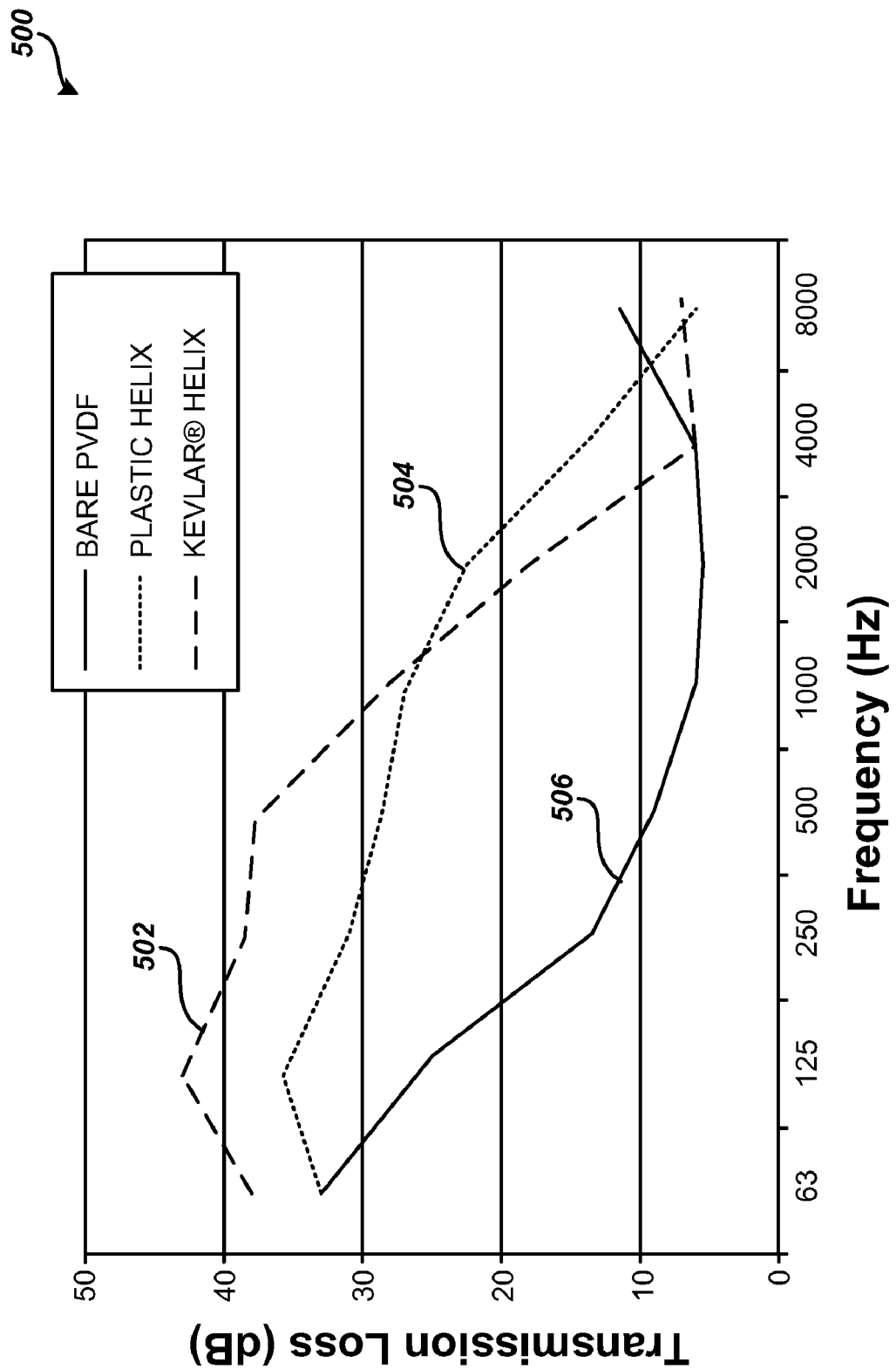
FIG. 5 is a line graph depicting the relative sound dampening performance of ducts incorporating various flexuous cord materials.

As described briefly above, the noise attenuating characteristics of the noise-reducing duct 102 also varies depending on the type of material used in the flexuous cord 110. FIG. 5 illustrates the relative noise attenuation performance of two PVDF foam ducts, each helically wound by a flexuous cord 110 of similar size and pitch, one fabricated from plastic (PEI) and one from KEVLAR®. As in FIG. 3, the line graph 500 shown in FIG. 5 depicts the transmission loss or reduction in sound level, measured in decibels (dB), attained by different air ducts at different acoustic frequencies, expressed in Hertz (Hz).

As shown in the line graph 500, a duct having a KEVLAR® flexuous cord 110 provides greater noise reduction in the lower frequency range of 65 Hz to 1600 Hz, as depicted by line 502, while duct having a plastic flexuous cord 110 provides greater reduction of noise in the upper frequency range of 1600 Hz to 8000 Hz, as depicted by line 504. For comparison, the line graph 500 in FIG. 4 also shows the noise attenuation performance of a PVDF foam duct having no helically wound flexuous cord 110, depicted by line 506.

Figure 6:
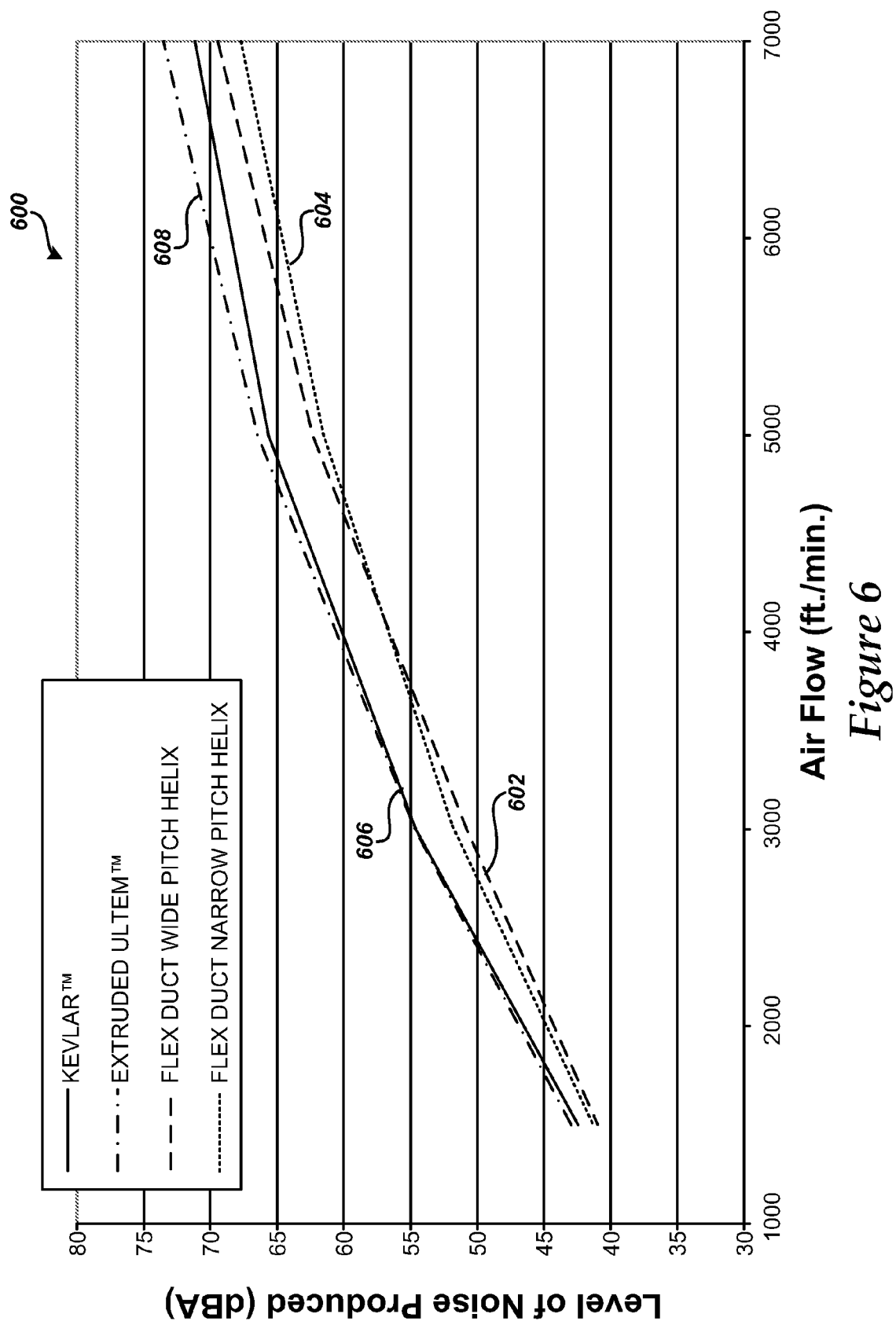
FIG. 6 is a line graph depicting the level of noise produced by air flowing through various duct configurations.

In addition to attenuating noise in the desired frequency range, the noise-reducing duct 102 described herein also produces less noise from airflow through the ECS than ducts made of alternative materials. The line graph 600 shown in FIG. 6 illustrates the level of noise produced, measured is A-weighted decibels (dBA), for several types of ducts at various airflow rates, expressed in feet-per-minute. As shown in the line graph 600, noise-reducing ducts 102 constructed of silicone glass-fiber having flexuous cords 110 wound at both wide and narrow pitches 112, depicted by lines 602 and 604 respectively, produce less airflow noise at all flow rates than ducts made of KEVLAR® or extruded PEI (ULTEM®), depicted by lines 606 and 608.

Figure 7:
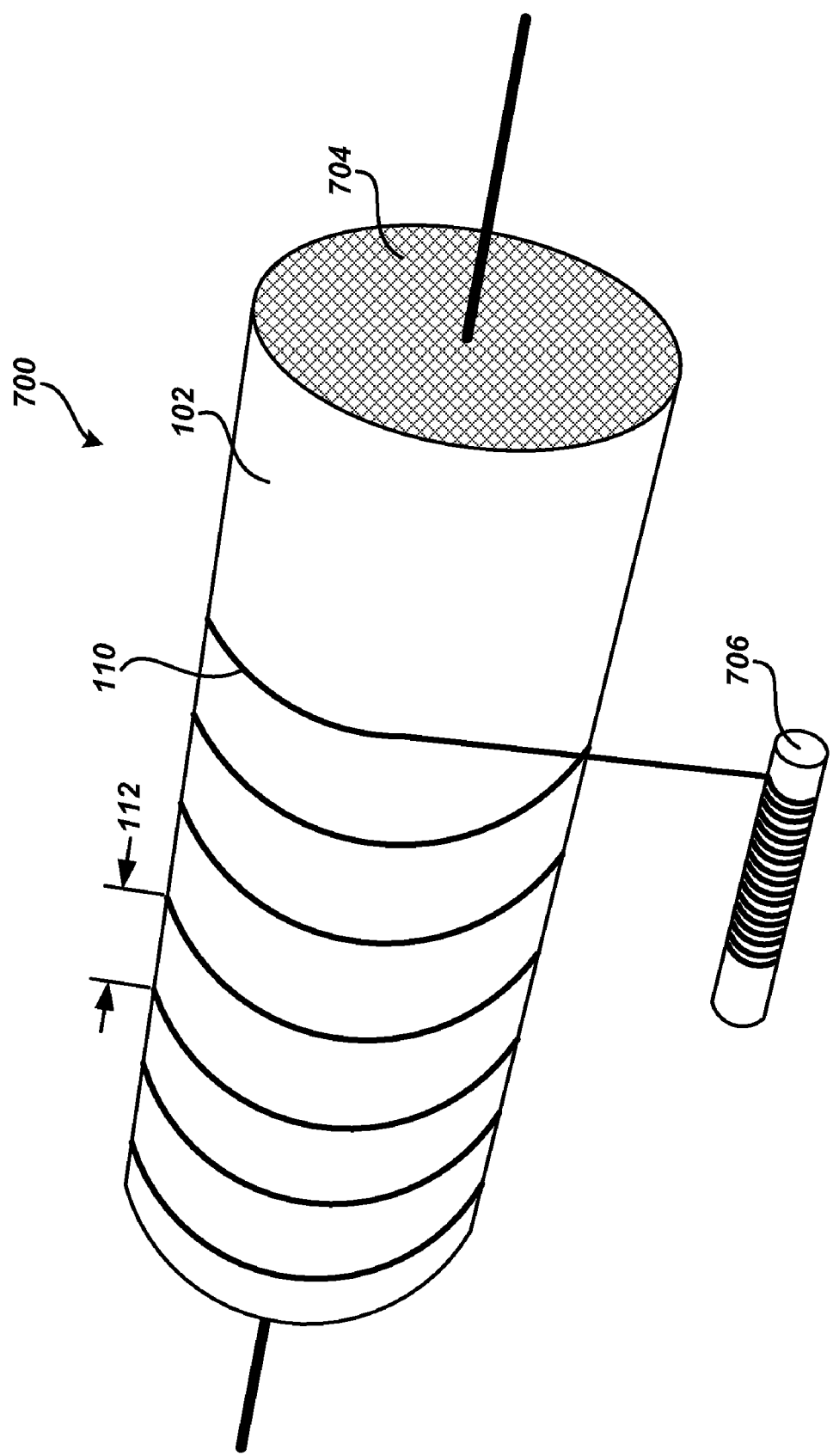
FIG. 7 is a perspective view illustrating one method for fabricating a noise-reducing duct according to embodiments described herein.

FIG. 7 shows one method for fabricating a noise-reducing duct 102 described in the embodiments above. The flexuous cord 110 is helically wound around the outer surface of the duct 102 by mounting the duct 102 on a spindle 704 and rotating the spindle 704 to draw the flexuous cord 110 from a spool 706 onto the surface of the duct 102. The flexuous cord 110 is applied to the surface of the duct in a continuous length, maintaining the desired pitch 112. The desired pitch 112 may be achieved by having the spool 706 move at a specific speed along the length of the spindle 704 as the spindle is rotated. In one embodiment, an adhesive is applied to the flexuous cord 110 before it contacts the surface of the duct 102 in order to bond the flexuous cord 110 to the surface. In another embodiment, the duct 102 is coated with a thin layer of adhesive before the flexuous cord 110 is applied.

Figure 8:
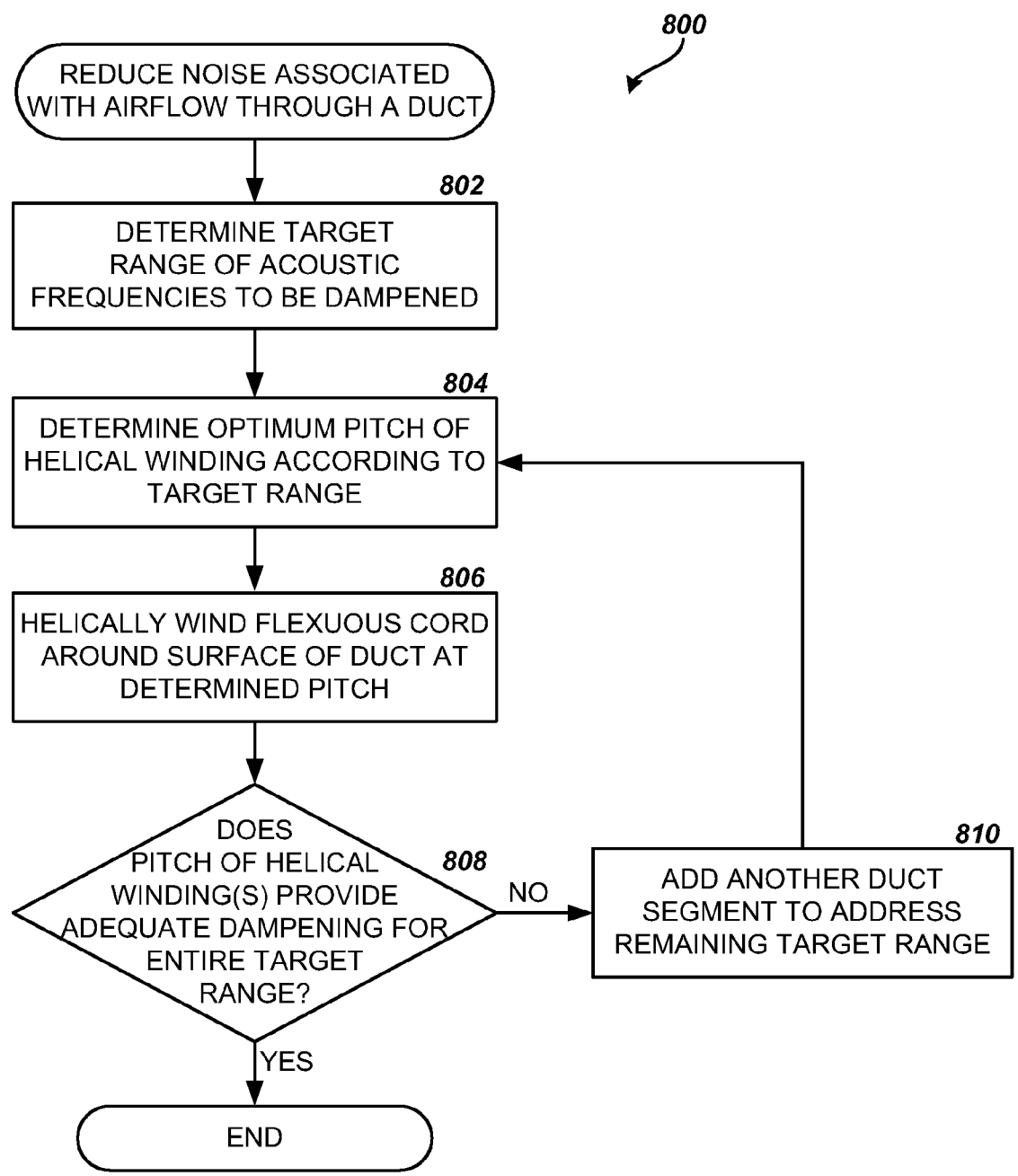
FIG. 8 is a flow diagram showing one method of reducing noise associated with airflow through a duct, according to embodiments described herein.

As described above, the noise attenuating effects of the helically wound component can be tuned to dampen the desired acoustic frequency range by varying the pitch 112 of the helical winding or by providing multiple helically wound flexuous cords 110 of differing pitches. FIG. 8 provides a method for reducing noise in an air duct over a target frequency range, according to embodiments. It should be appreciated that more or fewer operations may be performed than shown in FIG. 8 and described herein. These operations may also be performed in a different order than those described herein.

The routine 800 begins at operation 802, where a target range of acoustic frequencies to be dampened is determined. The target range will depend upon the environment where the duct 102 is being utilized and the desired noise attenuation effect. For example, as described above, the cabin of an aircraft experiences low frequency noise in the range of 60 Hz to 2000 Hz, generated by the aircraft engines, ECS, other aircraft systems, and boundary layer airflow over the fuselage. The target range of acoustic frequencies for an aircraft cabin, therefore, may be this 60 Hz to 2000 Hz range.

Once the target range of acoustic frequencies to be dampened is determined at operation 802, the routine 800 continues to operation 804, where the optimum pitch 112 of a helically wound flexuous cord 110 is determined to attenuate the target range of frequencies in the duct 102. The pitch 112 may be determined through experimentation with the types and sizes of ducts being used, or may be calculated based on a formula describing the noise attenuating effect of the noise-reducing duct 102. The pitch value may also depend on the material and profile of the flexuous cord 110 being wound around the duct 102.

From operation 804, the routine 800 continues to operation 806, where the flexuous cord 110 is helically wound around the duct 102 at the determined pitch 112. This may be performed by a method similar to that described above in regard to FIG. 7. As further described above, the noise attenuation characteristics of the noise-reducing duct 102 depend upon the pitch 112 of the helical winding of the flexuous cord 110 as well as the material from which the cord 110 is constructed. If it is determined at operation 808 that the noise-reducing duct 102 wound with a flexuous cord 110 at the determined optimal pitch 112 does not adequately dampen noise across the entire target range of acoustic frequencies, then the routine 800 continues to operation 810.

At operation 810, an additional helically wound flexuous cord 110 or an additional duct segment is added to the noise-reducing duct 102, targeting the portion of the range of acoustic frequencies not adequately dampened by the first flexuous cord 110 or duct segment. From operation 810, the routine 800 returns to operation 804, where an optimum pitch for the helical winding for the additional flexuous cord 110 or duct segment is determined according to the portion of the target range of frequencies. Once it is determined, at operation 808, that sufficient noise reduction is achieved across the entire target range by the combination of flexuous cord(s) 110 and duct segment(s), the routine 800 ends.

Based on the foregoing, it should be appreciated that technologies for the reduction of noise are provided herein. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A sound-dampening apparatus, comprising:
    a duct that interfaces with a fluid flow;
    a first flexuous cord helically wound around a surface of the duct such that adjacent windings are aligned at a pre-determined pitch according to a target range of acoustic frequencies of noise caused by the fluid flow through the duct to be dampened; and
    a second flexuous cord helically wound around the surface of the duct at a different pitch from the first flexuous cord, the different pitch determined according to a second target range of acoustic frequencies to be dampened.

2. The apparatus of claim 1, wherein the flexuous cord is helically wound around an outer surface of the duct.

3. The apparatus of claim 1, wherein the flexuous cord is helically wound around an inner surface of the duct.

4. The apparatus of claim 1, wherein the duct comprises a flexible hose used in an environmental control system for conducting airflow.

5. The apparatus of claim 1, wherein the duct comprises a rigid air duct.

6. The apparatus of claim 1, wherein the flexuous cord is bonded to an inside or an outside surface of the duct.

7. The apparatus of claim 1, wherein the duct comprises layered composite material and wherein the flexuous cord is helically wound around the duct between two adjacent layers of the layered composite material.

8. The apparatus of claim 1, wherein the flexuous cord comprises an extruded plastic cord of a material that exhibits noise attenuation in the target range of acoustic frequencies.

9. The apparatus of claim 1, wherein the flexuous cord comprises a metal cord.

10. The apparatus of claim 1, wherein the flexuous cord comprises a synthetic fiber member of a material that exhibits noise attenuation in the target range of acoustic frequencies.

11. The apparatus of claim 1, wherein the flexuous cord comprises a substantially round cross-section.

12. The apparatus of claim 1, wherein the flexuous cord comprises a substantially triangular cross-section.

13. The apparatus of claim 1, wherein the flexuous cord comprises a substantially rectangular cross-section.

14. The apparatus of claim 1, wherein the flexuous cord comprises at least one hollow portion.

15. A method for dampening acoustic noise emanating around a duct comprising a plurality of segments, the method comprising:
    determining a target range of frequencies of the acoustic noise to be dampened; and
    helically winding a flexuous cord around a surface of each of the plurality of segments of the duct at a pre-determined pitch according to the target range of frequencies of the acoustic noise to be dampened, wherein each of the plurality of segments has the flexuous cord helically wound around the duct at a different pitch to dampen the acoustic noise in a different portion of the target range of frequencies.

16. A noise-reducing duct comprising;
    a substantially cylindrical, flexible surface configured to encompass an airflow through the duct, the duct comprising a plurality of segments; and
    a flexuous cord helically wound around each of the plurality of segments of the duct and bonded to the surface at a pitch corresponding to a target range of acoustical frequencies of noise caused by the airflow through the noise-reducing duct, the pitch of the helical winding of the flexuous cord for each of the plurality of segments being different from the other segments to dampen noise in a different range of acoustical frequencies.

17. The duct of claim 16, wherein the flexuous cord comprises one of an extruded plastic, a metal, and a synthetic fiber of a material that exhibits noise attenuation in the target range of acoustical frequencies.

* * * * *